United States Patent [19]

Ashi et al.

[11] Patent Number: 5,351,238

[45] Date of Patent: Sep. 27, 1994

[54] METHOD OF CONTROLLING A FRAME PHASE OF A TIME-DIVISION SWITCH AND FRAME PHASE VARIABLE TIME-DIVISION SWITCH

[75] Inventors: Yoshihiro Ashi, Yokohama; Yukio Nakano, Hachioji; Kenji Takeda, Nagoya, all of Japan

[73] Assignees: Hitachi, Ltd., Tokyo; Hitachi Communication System Inc., Yokohama

[21] Appl. No.: 719,912

[22] Filed: Jun. 24, 1991

[30] Foreign Application Priority Data

Jun. 25, 1990 [JP] Japan ................... 2-164143

[51] Int. Cl.$^5$ .......................................... H04Q 11/04
[52] U.S. Cl. ......................................... 370/66; 370/63; 370/68
[58] Field of Search .............. 370/66, 64, 63, 58.3, 370/58.2, 58.1, 68, 100.1, 105.1, 105.3, 108

[56] References Cited

U.S. PATENT DOCUMENTS 4,608,684  8/1986  Upp .............................. 370/100.1
4,894,821  1/1990  Hayano ............................ 370/63
4,941,141  7/1990  Hayano ............................ 370/66
5,123,012  6/1992  Suzuki et al. ..................... 370/66

OTHER PUBLICATIONS

Electric Telecommunication Association, "Digital Transmission Terms" Dec., 1988, p. 74.

Primary Examiner—Douglas W. Olms
Assistant Examiner—Shick Hom
Attorney, Agent, or Firm—Antonelli, Terry, Stout & Kraus

[57] ABSTRACT

A frame phase variable time-division switch according to the present invention comprises an input highway, a data memory for storing data multiplexed on the data highway, an output highway to which data read out of the data memory is outputted, a control memory for storing a write address or a read address of the data memory, a write counter for generating a write pulse, a read counter for generating a read pulse, a write reset terminal for inputting a pulse for controlling the phase of the write counter, and a read reset terminal for inputting a pulse for controlling the phase of the read counter.

24 Claims, 4 Drawing Sheets

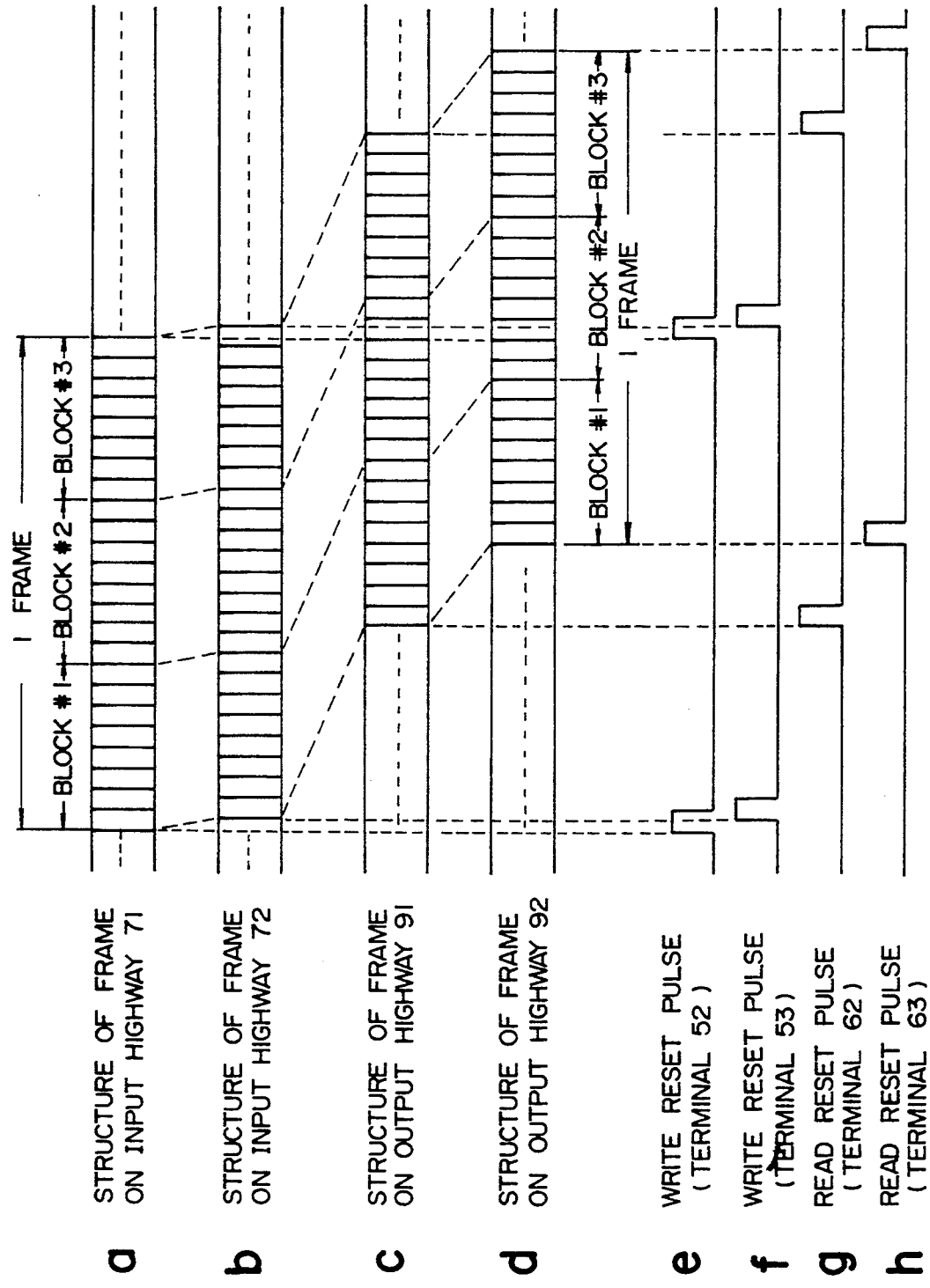

METHOD OF CONTROLLING A FRAME PHASE OF A TIME-DIVISION SWITCH AND FRAME PHASE VARIABLE TIME-DIVISION SWITCH

BACKGROUND OF THE INVENTION

The present invention relates to a method to controlling a highway frame phase of a time-division switch in a digital cross connect and digital exchanger and a time-division switch for variably controlling a frame phase.

Conventional digital cross connect and digital exchangers require a time-division switch which has a multi-switching function, i.e., a switching of channels simultaneously using a plurality of time slots. The multi-slot switching in turn requires that the time order of a plurality of time slots do not change after a switching operation, which is referred to as "Security of TSSI (Time Slot Sequency Integrity)".

Conventional system for achieving the security of TSSI for a time-division switch includes a double buffer system as described in a revised edition of "Digital Transmission Terms", edited and published Dy Electric Telecommunications Association, December 1988, page 74. The double buffer system has two data memories respectively provided with a single port. When data is being written into one of the two data memories, read-out is being executed from the other one. This state is maintained for one frame period equal to a switching period, thus exchanging one memory in a writing state and the other memory in a reading state at intervals of a frame.

In the conventional double buffer system, the two memories should be mutually switched between the writing state and the reading state simultaneously at the boundary of each frame, whereby the frame phase of an input highway of the time-division switch and the frame phase of an output highway of the same must be in a fixed phase relation with each other. Therefore, if the input highway is not in a fixed relation with the output highway or if a clock of the input highway varies with respect to a clock of the output highway, it is necessary to employ a buffer or an elastic store prior to connecting the input highway to a data memory to meet the frame phase of the input highway with the frame phase of the output highway, which results in a larger circuit configuration. Also, if a plurality of input highways comprised in a time-division switch have mutual phase variations, it is necessary to provide each of the input highways with an elastic store to cancel such clock phase variations, which also results in a larger circuit configuration. Further, in a time-division switch having a plurality of output highways, if the frame phases of the respective output highways are different from one another due to circuit configurations of the respective destinations connected thereto, it is necessary to provide each of the output highways with a buffer, which also causes a larger circuit configuration.

SUMMARY OF THE INVENTION

It is an object of the present invention to provide a frame phase control method for a time-division switch which is capable of performing a time-division switching which ensures the TSSI without incurring a large enlargement of the circuit scale even if the frame phrases of an input highway and an output highway are not in a fixed phase relation, clock phases may vary among input highways, or frame phases of output highways are different from one another.

It is another object of the present invention to provide a frame phase variable time division switch which is capable of variably controlling frame phases of an input highway and an output highway, thus ensuring the TSSI with a high freedom.

To achieve the above objects, the method of controlling the frame phases of a time-division switch according to the present invention is adapted to determine the start position of a frame on an input highway and the start position of a frame on an output highway independently of each other for controlling the frame phase of a time-division switch which writes data multiplexed on a plurality of input highways into data memories, changes the multiplexed order of the data and reads the data in a changed order onto output highways thereby switching the data.

Also, for controlling the frame phase of a time-division switch having a plurality of input highways, the start position of each frame on the plurality of input highways is determined independently of the start positions of frames on the other input highways and the start position of a frame on the output highway.

Further, for controlling the frame phase of a time-division switch having a plurality of output highways, the start position of each frame on the plurality of output highways is determined independently of the start positions of frames of the other output highways and the start position of a frame on the input highway.

For ensuring the TSSI, in the above methods, the word length of the data memories is determined to be N times (N is an integer not less than 3) as long as an exchanging extent of the data on the highways, and the start position of a frame on the output highway is determined at a position corresponding to a time between a time which is delayed by more than one data exchanging extent from the start position of a frame on the input highway or a time delayed by a maximum value of a quantity of a clock phase fluctuation of the input highway with respect to the output highway from the time, and a time which is delayed by less than (N-1) times as long as the data exchanging extent or a time earlier by a maximum value of a quantity of a clock phase fluctuation of the input highway witch respect to the output highway than the time from the start position of the frame on the input highway.

To achieve the above objects, a frame phase variable time-division switch according to the present invention comprises an input highway, a data memory for storing data multiplexed on the data highway, an output highway to which data read out of the data memory is outputted, a control memory for storing a write address or a read address of the data memory, a write counter for generating a write pulse, a read counter for generating a read pulse, a write reset terminal for inputting a pulse from a clock for controlling the phase of the write counter, and a read reset terminal for inputting a pulse from a clock for controlling the phase of the read counter.

A frame phase variable time-division switch, if having a plurality of input highways, is provided with write counters and write reset terminals respectively for each of the input highways.

Also, a frame phase variable time-division switch, if having a plurality of output highways, is provided with read counters and read reset terminals for each of output highways.

The above-mentioned method of controlling the frame phase of a time-division switch and the frame phase variable time-division switch reset the write counter by a write frame pulse synchronized with a frame on the input highway, whereby the write counter is operated in synchronism with the frame on the input highway, and data multiplexed on the input highway is written into the data memory on the basis of this write counter. When the time-division switch is provided with a plurality of input highways, since the write operation is performed with a clock and a frame phase for each input highway independently of the other input highways, an elastic store or the like is not necessary even if a fluctuation in the clock phase occurs between the input highways. The phase of a frame on one of the output highways is determined at a position away from the phase of a frame on the input highway by a distance equal to more than a data exchanging extent or a distance derived by adding a maximum value of a quantity of a clock phase fluctuation of the input highway to the distance equal to more than a data exchanging extent, whereby an exchanging extent of data being written will not overlap with an exchanging extent of data being read to thereby ensure the TSSI. When the time-division switch has a plurality of output highways, the phase of a frame on each of the output highways is determined independently, whereby a buffer or the like is not necessary even if the frame phases are different from one output highway to another.

BRIEF DESCRIPTION OF THE DRAWINGS

FIGS. 4a-4h are timing charts illustrating the operation of the embodiment shown in FIG. 3.

DESCRIPTION OF THE PREFERRED EMBODIMENTS

Embodiments of the present invention will hereinbelow be described with reference to FIGS. 1-4.

Figure 1:
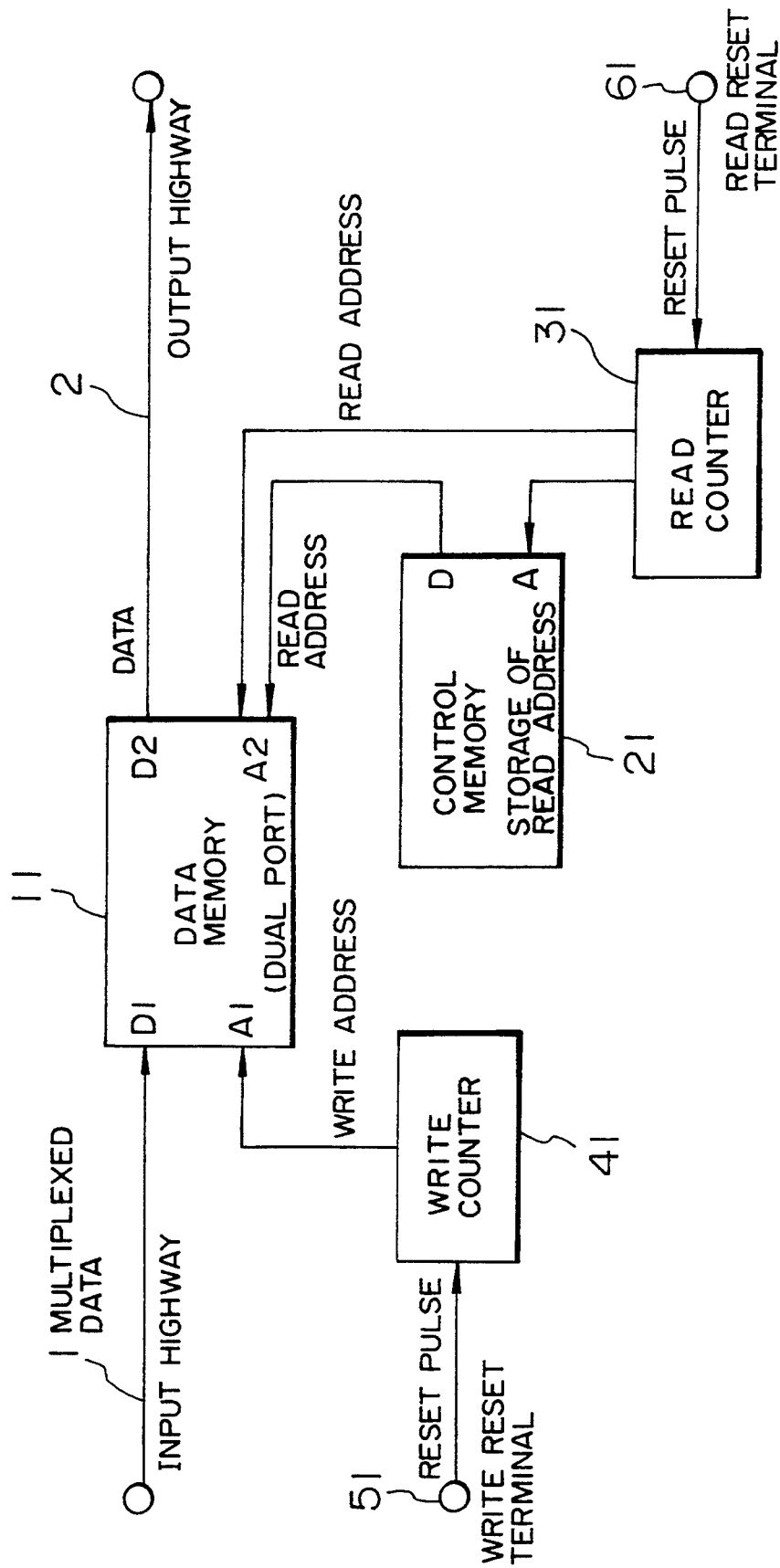
FIG. 1 is a block diagram illustrating an embodiment of the present invention.

FIG. 1 is a block diagram showing an embodiment of a frame phase control method for a time-division switch and a frame phase variable time-division switch. In FIG. 1, a time-division switch is composed of an input highway 1, a 24-word data memory 11 composed of dual port memories for storing data multiplexed on the input highway 1, an output highway 2 for outputting data read out of the data memory 11 after the multiplexed order of the data is converted, a write counter 41 for generating a write address of the data memory 11, a write reset terminal 51 for inputting a reset pulse which causes the count of the write counter 41 to be reset to zero, an eight-word control memory 21 for storing a read address of the data memory 11, a read counter 31 for generating a read address of the control memory 21, and a reset terminal 61 for inputting a reset pulse which causes the count of the read counter 31 to reset to zero. The reset pulses may be supplied by clocks which operate independent of each other.

Figure 2:
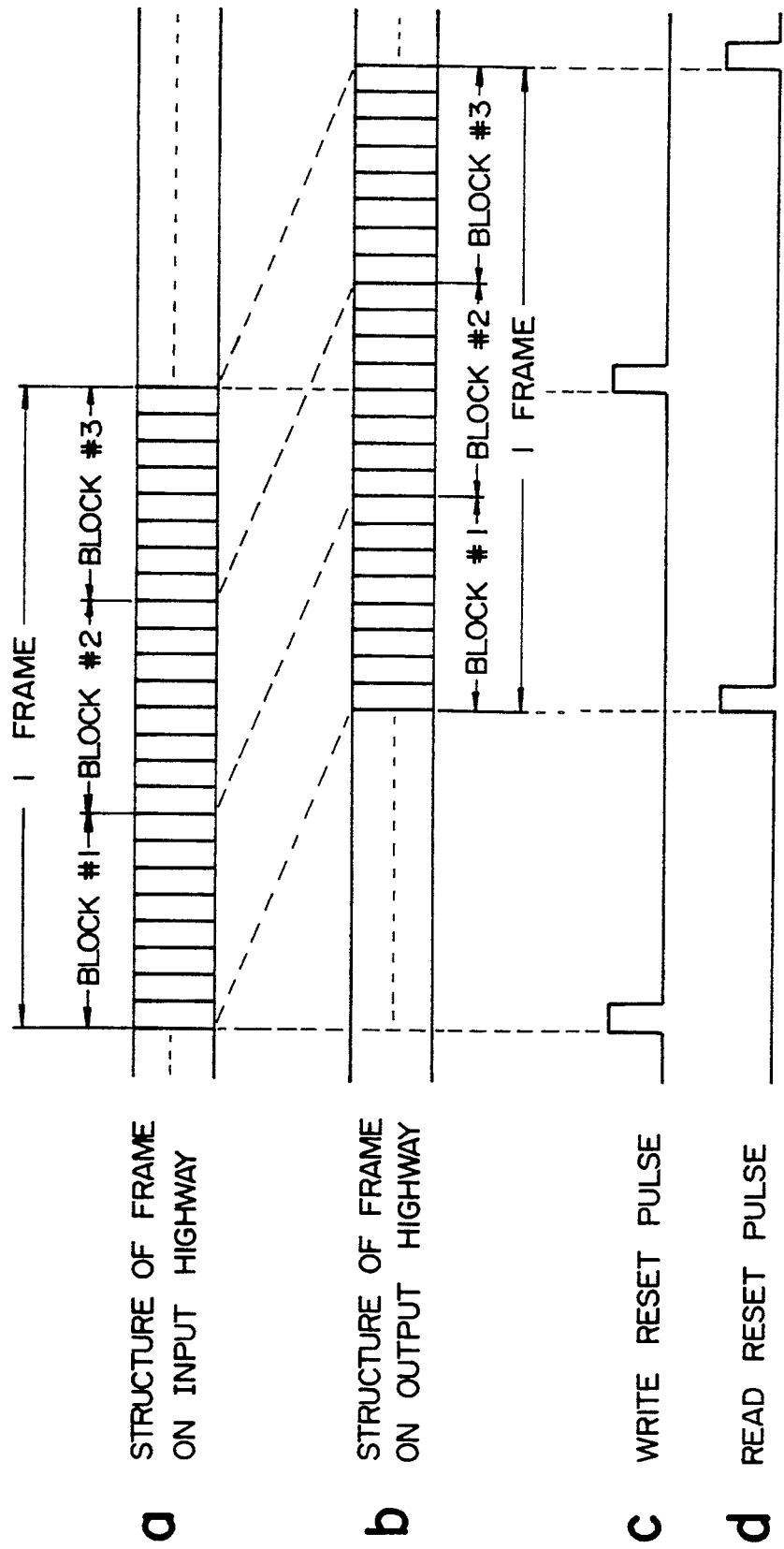
FIGS. 2a-2d are time charts illustrating the operation of the embodiment shown in FIG. 1.

FIGS. 2a-2d are timing charts illustrating the operation of the embodiment shown in FIG. 1. The operation of the embodiment of FIG. 1 will be next described with reference to FIG. 2. FIG. 2a illustrates the structure of a frame transmitted on the input highway 1. One frame is composed of three blocks (Blocks #1-#3) while each block is composed of eight time slots. Each channel is assigned to a time slot at the same position in each of the blocks. A switching operation is performed at intervals of a block, whereby the extent of data exchange is equal to the block. FIG. 2b illustrates the structure of a frame transmitted on the output highway 2 which is similar to that of the input highway 1 shown in FIG. 2a, however, the start position of the frame is delayed by approximately 1.5 blocks from that of the frame on the input highway 1. FIG. 2c illustrates a write reset pulse in synchronism with the start position of the frame of the input highway 1, while FIG. 2d a read reset pulse in synchronism with the start position of the frame of the output highway 2.

The write counter 41 shown in FIG. 1 is reset by the write reset pulse inputted therein at the write reset terminal 51 at the start position of the frame on the input highway 1, and counts up at intervals of a frame on the input highway 1 to supply a write address to an address terminal included in a first port provided in the data memory 11. Data time-division-multiplexed on the input highway 1 is sequentially written into the data memory 11 such that the start of a frame corresponds to the start address of the data memory 11. The read counter 31 is reset by the read reset pulse inputted therein at the read reset terminal 61 at the start position of the frame on the output highway 2, and counts up at intervals of a frame on the output highway 2 to generate a read address of the control memory 21 as well as the upper two bits of a read address of the data memory 11. The control memory 21, in accordance with a three-bit address supplied from the read counter 31, sequentially outputs the lower three bits of a read address of the data memory 11 at intervals of a block on the output highway. Data written into the data memory 11 is read out of a second port to the output highway 2 in accordance with an address supplied from the control memory 21 and the read counter 31. The lower three-bits of a read address supplied from the control memory 21 are used to convert the order of reading out data in a block to accomplish a switching function. The upper two bits of a read address supplied from the read counter 31 indicates a block in a read frame, whereby a similar switching function is repeated in each block.

The frame transmitted on the output highway 2, as shown in FIG. 2, is delayed by approximately 1.5 blocks from the frame on the input highway 1, so that a block on the input highway 1 will not be simultaneously transmitted on the output highway 2. More specifically, since each block is read out after it has been completely written into the data memory 11, data in a block will not be transferred to another block before or after a switching operation, thereby ensuring the TSSI among data. If a delayed amount of the frame on the output highway 2 with respect to the frame on the input highway 1 is more than one block and less than two blocks, the same block will not be simultaneously transmitted on the input highway 1 and the output highway 2. It will therefore be understood that the TSSI is ensured among data even if the clock of the input highway 1 is varied by a half block at maximum with respect to the output highway 2.

Figure 3:
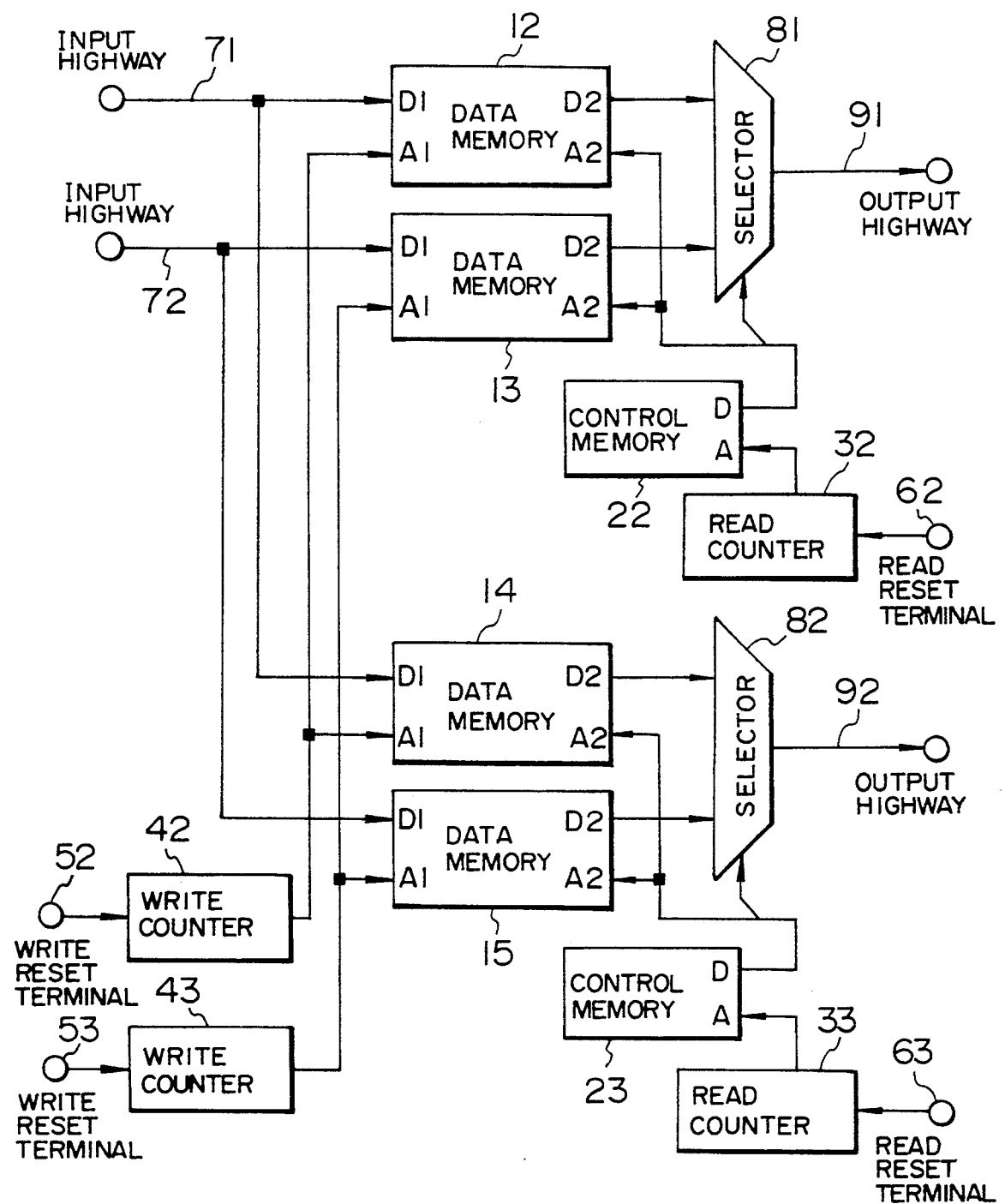
FIG. 3 is a block diagram illustrating another embodiment of the present invention.

FIG. 3 is a block diagram illustrating another embodiment of the frame phase control method for a time-division switch and the frame phase variable time-division switch according to the present invention. A time division switch shown in FIG. 3 comprises input highways 71, 72, 24-word data memories 12, 14 respectively composed of dual port memories for storing data multiplexed on the input highway 71, 24-word data memories 13, 15 respectively composed of dual port memories for storing data multiplexed on the input highway 72, output highways 91, 92, a selector 81 for selecting one of data from the data memory 12 and data from the data memory 13 to output the same onto the output highway 91, a selector for selecting one of data from the data memory 14 and data from the data memory 15 to output the same to the output highway 92, a write counter 42 for generating write addresses of the data memories 12, 14, a write counter 43 for generating write addresses of data memories 13, 15, write reset terminals 52, 53 respectively for supplying the write counters 42, 43 with a reset pulse, an eight-word control memory 22 for storing read addresses of the data memories 12, 13, an eight-word control memory 23 for storing read addresses of the data memories 14, 15, read counters 32, 33 respectively for generating read addresses of the control memories 22, 23, and read reset terminals 62, 63 respectively for supplying the read counters 32, 33 with a reset pulse.

Next, the operation of frame phase variable time-division switch shown in FIG. 3 will be described with reference to timing charts of FIGS. 4a–4h illustrating the operation of the frame phase variable time-division switch. FIGS. 4a, 4b illustrate the structures of frames transmitted on the input highways 71, 72, respectively. As can be seen from the charts, the frames have the same format as that shown in FIG. 2a. The clock phase of the input highway 71 is not necessarily coincident with that of the input highway 72, where a slight difference may exist between these phases. FIGS. 4c, 4d illustrate the structures of frames transmitted on the output highways 91, 92, respectively. Similarly, these frames have the same format as that shown in FIG. 2b. The start position of the frame on the output highway 91 is delayed by approximately 1.25 blocks from the start positions of the frames on the input highways 71, 72, while the start position of the frame on the output highway 92 is delayed by approximately 1.75 blocks from the start positions of the frames on the input highways 71, 72. FIGS. 4e, 4f illustrate write reset pulses which are synchronized with the start positions of the frames on the input highways 71, 72, respectively, while FIGS. 4g, 4h read reset pulses which are synchronized with the start positions of the frames on the output highways 91, 92, respectively. A switching is generally performed between the two input highways and the two output highways, however, a switching between one of the input highway and one of the output highway may also be performed.

The write counter 42 shown in FIG. 3, similar to the embodiment shown in FIG. 1, is controlled by the write reset pulse inputted from the write reset terminal 52 to supply write addresses to address terminals included in first ports of the respective data memories 12, 14. Likewise, the write counter 43 is controlled by the write reset pulse inputted from the write reset terminal 53 to supply write addresses to address terminals included in first ports of the respective data memories 13, 15. Data on the input highway 71 is sequentially written into the data memories 12, 14 simultaneously one frame by one frame. Likewise, data on the input highway 72 is sequentially written into the data memories 13, 15 simultaneously one frame by one frame. The read counter 32 is controlled by the read reset pulse inputted from the read reset terminal 62 to generate a read address of the control memory 22 and the upper two bits of read addresses of the data memories 12, 13. Likewise, the read counter 33 is controlled by the read reset pulse inputted from the read reset terminal 63 to generate a read address of the control memory 23 and the upper two bits of read addresses of the respective data memories 14, 15. The control memory 22 outputs the lower three bits of respective read addresses to be supplied to the data memories 12, 13 and a control signal to be supplied to the selector 81 at intervals of a block. Likewise, the control memory 23 outputs the lower three bits of respective read addresses to be supplied to the data memories 14, 15 and a control signal to be supplied to the selector 82. Data written into the data memories 12, 13 are read out of second ports of the respective data memories 12, 13 in accordance with the addresses supplied from the control memory 22 and the read counter 32, and then one is selected by the selector 81 and outputted onto the output highway 91. Likewise, data written into the data memories 14, 15 are read out of second ports of the respective memories 14, 15 in accordance with the addresses supplied from the control memory 23 and the read counter 33, and then one is selected by the selector 82 and outputted onto the output highway 92.

As shown in FIGS. 4c, 4d, a frame on the highway 91 is delayed by approximately 1.25 blocks from frames on the input highways 71, 72, while a frame on the output highway 92 by approximately 1.75 blocks from frames on the input highways 71, 72, whereby blocks existing on the input highways 71, 72 will not simultaneously appear on the output highways 91, 92, thus ensuring the TSSI among data. The TSSI among data is also ensured even if the clocks of the input highways 71, 72 are fluctuated by 1/8 block at maximum with respect to the clocks of the output highways 91, 92.

The above described embodiments are provided with the control memories for storing read addresses supplied to the data memories. Alternatively, control memories may be provided for storing write addresses or read addresses of the data memories. The above embodiments have been described, as a specific example of ensuring the TSSI, for a case where the data memories are organized of 24 words and the exchange quantity is selected to be eight words, however, the present invention is not limited to such specific embodiments. Also, the present invention can be implemented to time-division switches having a plurality of input highways, a plurality of output highways or a plurality of input highways and a plurality of output highways. Further, while the embodiments employ two port memories which can be independently controlled, memories provided with more than three ports may also be employed in a similar manner.

According to the present invention, since the start positions of frames are respectively determined independently between the input highway and the outpost highway, between input highways or between the output highways, it is possible to provide a time-division switch which ensures the TSSI without adding a buffer or the like and accordingly reduce the hardware configuration even if the frame phases of the input highway and the output highway are not in a fixed phase relation, a clock phase fluctuation exists between the input highways, or the frame phases are different between the output highways.

Since the time-division switch of the present invention is provided with a data write circuit and a data read circuit independently of each other, it is also possible to ensure the TSSI with a high freedom for the frame phases of the input and output highways.

We claim:

1. A method of controlling a frame phase of a time-division switch comprising the steps of:
   writing data multiplexed on an input highway into a data memory;
   changing the multiplexed order of said data written in said data memory;
   reading said data in a changed order onto an output highway to thereby switch said data; and
   determining the start position of a frame on said input highway independently of the start position of a frame on the output highway;
   wherein the word length of said data memory is determined to be at least N times, N is an integer not less than 3, as long as an exchanging extent of the data on the highways, and the start position of a frame on said output highway is determined at a position corresponding to a time between a time which is delayed by more than one data exchanging extent from the start position c f a frame on said input highway and a time which is delayed by less than (N-1) times as long as the data exchanging block from the start position of the frame on said input highway.

2. A method of controlling a frame phase of a time-division switch comprising the steps of:
   writing data multiplexed on a plurality of highways into data memories;
   changing the multiplexed order of said data written in said data memories;
   reading said data in a changed order onto more than one output highway to thereby switch said data; and
   determining the start position of each frame on the plurality of input highways independently of the start positions of frames on the other input highways and the start positions of frames on the output highways;
   wherein the word length of said data memories is determined to be at least N times, N is an integer not less than 3, as long as an exchanging extent of the data on the highways, and the start position of a frame on said output highway is determined at a position corresponding to a time between a time which is delayed by more than one data exchanging extent from the start position of a frame on said input highway and a time which is delayed by less than (N-1) times as long as the data exchanging extent from the start position of the frame on said input highway.

3. A method of controlling a frame phase of a time-division switch comprising the steps of:
   writing data multiplexed on an input highway;
   changing the multiplexed order of said data written on said input highway;
   reading said data in a changed order onto a plurality of output highways to thereby switch said data; and
   determining the start position of each frame on the plurality of output highways independent of the start positions of frames on the other output highways and the start position of a frame on the input highway;
   wherein the word length of said data memories is determined to be at least N times, N is an integer not less than 3, as long as an exchanging extent of the data on the highways, and the start position of a frame on said output highway is determined at a position corresponding to a time between a time which is delayed by more than one data exchanging extent from the start position of a frame on said input highway and a time which is delayed by less than (N-1) times as long as the data exchanging extent from the start position of the frame on said input highway.

4. A method of controlling a frame phase of a time-division switch comprising the steps of:
   writing data multiplexed on an input highway into a data memory;
   changing the multiplexed order of said data written in said data memory;
   reading said data in a changed order onto an output highway to thereby switch said data; and
   detaining the start position of a frame on said input highway independently of the start position of a frame on the output highway;
   wherein the word length of said data memory is determined to be at least N times, N is an integer not less than 3, as long as an exchanging extent of the data on the highways, and the start position of a frame on said output highway is determined at a position corresponding to a time between a time which is delayed by a period derived by adding a maximum value of a quantity of clock phase fluctuation of said input highway with respect to said output highway to more than one data exchanging extent from the start position of a frame on said input highway and a time which is delayed by a period derived by subtracting the maximum value of the quantity of the clock phase fluctuations from less than (N-1) times as long as the data exchanging extent from the start position of the frame on said input highway.

5. A method of controlling a frame phase of a time-division switch comprising the steps of:
   writing data multiplexed on a plurality of highways into data memories;
   changing the multiplexed order of said data written in said data memories;
   reading said data in a changed order onto more than one output highway to thereby switch said data; and
   determining the start position of each frame on the plurality of input highways is determined independently of the start positions of frames on the other input highways and the start positions of frames on the output highways;
   wherein the word length of said data memories is determined to be at N times, N is an integer not less than 3, as long as an exchanging extent of the data on the highways, and the start position of a frame on said output highway is determined at a position corresponding to a time between a time which is delayed by a period derived by adding a maximum value of a quantity of clock phase fluctuation of said input highway with respect to said output highway to more than one data exchanging extent from the start position of a frame on said input highway and a time which is delayed by a period derived by subtracting the maximum value of the quantity of the clock phase fluctuation from less than (N-1) times as long as the data exchanging extent from the start position of the frame on said input highway.

6. A method of controlling a frame phase of a time-division switch comprising the steps of:
writing data multiplexed on an input highway into a data memory;
changing the multiplexed order of said data written in said data memory on said input highway; and
reading said data in a changed order onto a plurality of output highways to thereby switch said data; and
determining the start position of each frame on the plurality of output highways independent of the start positions of frames on the other output highways and the start position of a frame on the input highway;
wherein the word length of said data memory is determined to be at least N times, N is an integer not less than 3, as long as an exchanging extent of the data on the highways, and the start position of a frame on said output highway is determined at a position corresponding to a time between a time which is delayed by a period derived by adding a maximum value of a quantity of clock phase fluctuation of said input highway with respect to said output highway to more than one data exchanging extent from the start position of a frame on said input highway and a time which is delayed by a period derived by subtracting the maximum value of the quantity of the clock phase fluctuation from less than (N-1) times as long as the data exchanging extent from the start position of the frame on said input highway.

7. A method of controlling a frame phase of a time-division switch according to claim 1, wherein said data exchanging extent of said highways is equal to a frame on the highways which has a length equal to a switching cycle.

8. A method of controlling a frame phase of a time-division switch according to claim 2, wherein said data exchanging extent of said highways is equal to a frame on the highways which has a length equal to a switching cycle.

9. A method of controlling a frame phase of a time-division switch according to claim 3, wherein said data exchanging extent of said highways is equal to a frame on the highways which has a length equal to a switching cycle.

10. A method of controlling a frame phase of a time-division switch according to claim 4, wherein said data exchanging extent of said highways is equal to a frame on the highways which has a length equal to a switching cycle.

11. A method of controlling a frame phase of a time-division switch according to claim 5, wherein said data exchanging extent of said highways is equal to a frame on the highways which has a length equal to a switching cycle.

12. A method of controlling a frame phase of a time-division switch according to claim 6, wherein said data exchanging extent of said highways is equal to a frame on the highways which has a length equal to a switching cycle.

13. A frame phase variable time-division switch comprising:
an input highway;
a data memory for storing data multiplexed on said data highway, said data memory being at least three times the data exchange extent;
an output highway to which data read out of said data memory is outputted;
a control memory for storing a write address or a read address of said data memory;
a write counter for generating a write pulse;
a read counter for generating a read pulse;
a write reset terminal for inputting a pulse for controlling the phase of said write counter; and
a read reset terminal for inputting a pulse for controlling the phase of said read counter.

14. A frame phase variable time-division switch comprising:
a plurality of input highways;
data memories for storing data multiplexed on said data highways, each of said data memories being at least three times the data exchange extent;
more than one output highway to which data read out of said data memories are outputted;
control memories provided for each of output addresses for storing write addresses or read addresses of said data memories;
write counters provided for each of said highways for generating a write pulse;
a read counter for generating a read pulse;
write reset terminals provided for each of said write counters for inputting a pulse for controlling the phase of said write counter; and
read reset terminals for inputting a pulse controlling the phase of said read counters.

15. A frame phase variable time-division switch comprising:
an input highway;
a data memory for storing data multiplexed on said data highway, said data memory being at least three times the data exchange extent;
a plurality of output highways to which data read out of said data memory is outputted;
control memories provided for each of said output highways for storing a write address or a read address of said data memory;
a write counter generating a write pulse;
read counters provided for each of said output highways for generating a read pulse;
a write reset terminal for inputting a pulse for controlling the phase of said write counter; and
read reset terminals provided for each of said read counters for inputting a pulse for controlling the phase of said read counters.

16. A frame phase variable time-division switch according to claim 13, wherein said data memory is composed of memory devices having more than two ports which are independently accessible.

17. A frame phase variable time-division switch according to claim 14, wherein said data memories are composed of memory devices having more than two ports which are independently accessible.

18. A frame phase variable time-division switch according to claim 15, wherein said data memories are composed of memory devices having more than two ports which are independently accessible.

19. A frame phase variable time-division switch comprising:
an input highway;
a data memory for storing data multiplexed on said data highway;

an output highway to which data read out of said data memory is outputted;

a control memory for storing a write address or a read address of said data memory;

a write counter for generating a write pulse;

a read counter for generating a read pulse;

a write reset terminal for inputting a pulse for controlling the phase of said write counter;

a read reset terminal for inputting a pulse for controlling the phase of said read counter; and a write clock for outputting a pulse to said write reset terminal and a read clock for outputting a pulse to said read reset terminal, said write and read clocks operating independent of each other.

20. A frame phase variable time-division switch comprising:

a plurality of input highways;

data memories for storing data multiplexed on said plurality of input highways;

more than one output highway to which data read out of said data memories are outputted;

control memories provided for each of output addresses for storing write addresses or read addresses of said data memories;

write counters provided for each of said input highways for generating a write pulse;

a read counter for generating a read pulse;

write reset terminals provided for each of said write counters for inputting a pulse for controlling the phase of said write counter;

read reset terminals for inputting a pulse for controlling the phase of said read counters;

a write clock for outputting a pulse to said write reset terminal and a read clock for outputting a pulse to said read reset terminal, said write and read clocks operating independent of each other.

21. A frame phase variable time-division switch comprising:

an input highway;

a data memory for storing data multiplexed on said data highway;

a plurality of output highways to which data read out of said data memory is outputted;

control memories provided for each of said output highways for storing a write address or a read address of said data memory;

a write counter generating a write pulse;

read counters provided for each of said output highways for generating a read pulse;

a write reset terminal for inputting a pulse for controlling the phase of said write counter;

read reset terminals provided for each of said read counters for inputting a pulse for controlling the phase of said read counters;

a write clock for outputting a pulse to said write reset terminal and a read clock for outputting a pulse to said read reset terminal, said write and read clocks operating independent of each other.

22. A frame phase variable time-division switch according to claim 21, wherein said data memory is composed of memory devices having more than two ports which are independently accessible.

23. A frame phase variable time-division switch according to claim 20, wherein said data memories are composed of memory devices having more than two ports which are independently accessible.

24. A frame phase variable time-division switch according to claim 21, wherein said data memory is composed of memory devices having more than two ports which are independently accessible.

* * * * *